March 1, 1955 A. J. PAYNTER 2,703,174
GRAIN RECLEANER AND SEPARATOR
Filed June 19, 1952
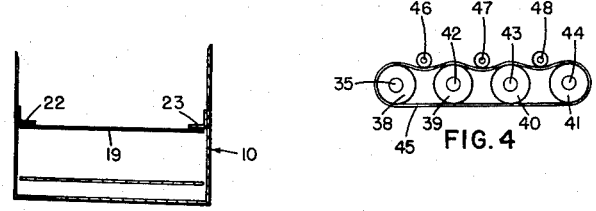
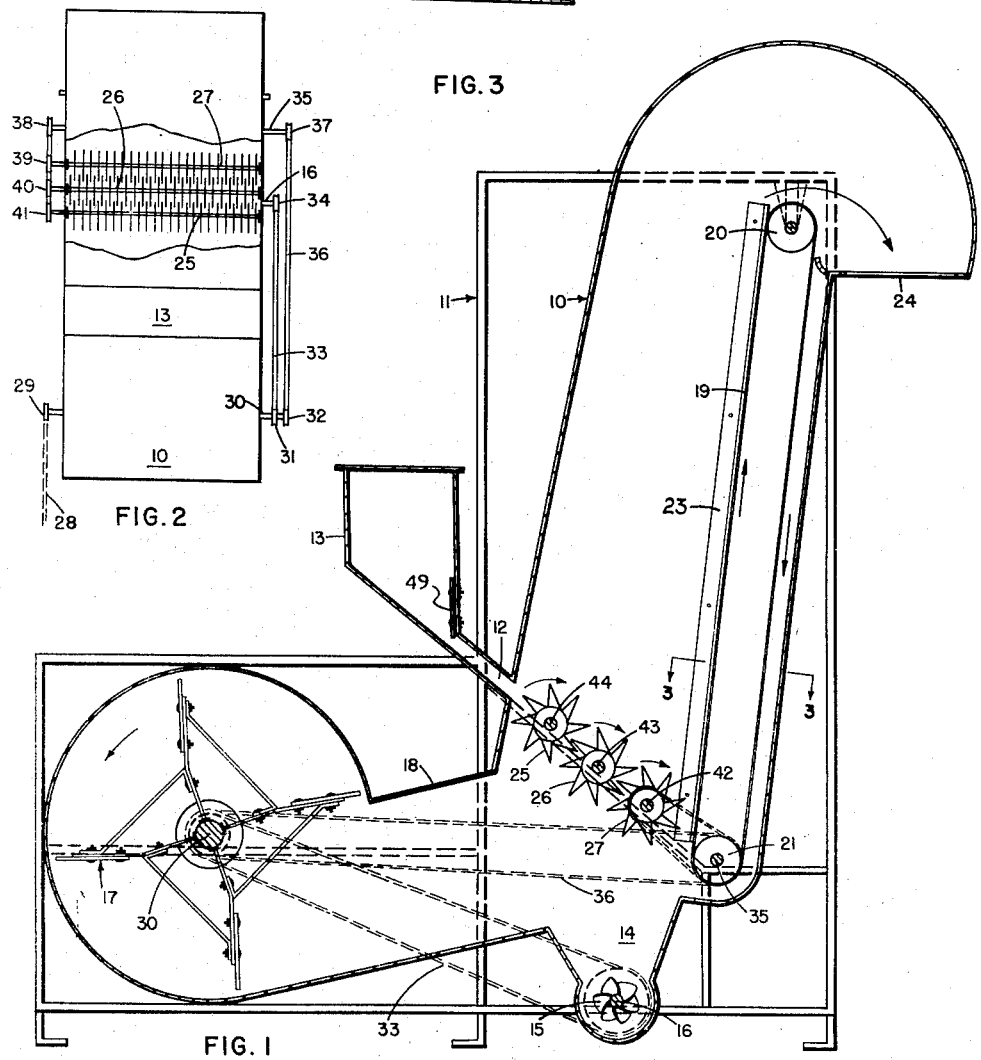
ALBERT J. PAYNTER
*INVENTOR.*

2,703,174

GRAIN RECLEANER AND SEPARATOR

Albert J. Paynter, Wichita, Kans.

Application June 19, 1952, Serial No. 294,439

12 Claims. (Cl. 209—138)

The invention described herein relates generally to grain cleaners, and more particularly to an improved cleaner capable of separating and removing individual grains or kernels of cheat, chess or brome grass from a mixture of wheat grains and such lighter weight grass grains.

The growth of such light weight grass grains, especially cheat, in wheat fields has in recent years become a considerable problem to wheat growers. The grains are inferior to wheat grains, yet are threshed out along with the wheat, and result in the wheat grower having to sell his wheat at a price lower than market price. Furthermore, if he uses part of his harvest as seed for the following year without first removing all cheat grass grains from the seed wheat, the percentage of cheat grass grains in the next year's harvest is greatly increased. The conventional re-cleaners with which most grain combines are equipped are not capable of separating the cheat grass grains from the wheat grains.

It is the chief object of this invention, therefore, to provide a re-cleaner which may either be installed on and driven by a combine, or which may be used as a stationary power driven cleaner at any desired location, and which will separate cheat grass grains and other unwanted grains which are lighter in weight than wheat grains, from threshed wheat grains.

Another object is to accomplish this purpose by a simply constructed cleaner which utilizes an air blast passing through the falling grain mixture to force the lighter weight grains against an upwardly moving belt, gravity causing the heavier wheat grains to fall downward off of the belt. The lighter weight unwanted grains are carried to a dump point by the moving belt, assisted by the air blast, while the wheat grains are collected and moved by a conveyor to a separate dump point.

Another object is to provide a cleaner which will simultaneously remove chaff and other unwanted impurities from wheat grains passed through the machine.

The invention, together with other objects, will be more clearly understood when the following description is read in connection with the accompanying drawings, in which:

Fig. 1 is a vertical longitudinal schematic sectional view through a cleaner embodying the invention;

Fig. 2 is a top plan view, with a portion of the housing cut away, and illustrates the manner of driving the various components;

Fig. 3 is a sectional view taken along the line 3—3 of Fig. 1; and

Fig. 4 is an end view showing details of the picker roll drive.

Referring to Fig. 1, it will be seen that the cleaner illustrated includes a closed substantially L-shaped housing 10, preferably supported in a frame 11. The housing has an inlet 12, the same width as the housing, in communication with a hopper 13. The housing includes a settling chamber 14, located below the inlet 12, and in the bottom of the housing. The lower part of this chamber is quasi-cylindrical, and houses an auger type conveyor 15, mounted on a suitably journaled shaft 16.

In the horizontal leg of housing 10 a centrifugal type blower fan 17 is mounted. A reduced area duct 18 directs an air blast from the fan 17 across the space between inlet 12 and settling chamber 14, and directly toward the lower end of the upright leg of the housing.

A flexible endless belt 19, substantially the same width as the housing, is mounted to run over belt pulleys 20 and 21, one journaled near each end of the upright leg of the housing. A pair of outwardly projecting flanges 22 and 23 overlie the opposite side edges of that run of the belt which faces the air blast from fan 17. These flanges prevent material being treated from being blown past the edges of this upwardly traveling run of the belt.

Adjacent the upper end of the downwardly traveling run of the belt, housing 19 is provided with a hooded outlet 24 for discharging separated material, such as cheat, chaff, etc.

A series of parallel picker rolls 25, 26, and 27 substantially span the space in the housing between inlet 12 and chamber 14, and between the air blast discharge duct 18 and the lower end of belt 19. Each picker roll consists of a plurality of sheet metal star wheels fixed on a journaled shaft, all wheels being substantially parallel to each other and normal to the shaft axis. The star wheels of each picker roll operate between the star wheels of adjacent rolls, as clearly shown in Fig. 2, and all picker rolls rotate in a direction to throw material toward the upwardly traveling run of belt 19, as indicated by the arrows of Fig. 1.

As a means of driving the cleaner, power is transmitted by a driven belt 28 (Fig. 2) to a pulley 29 fixed on fan shaft 30. At its opposite end, shaft 30 carries a pair of V-belt pulleys 31 and 32. Pulley 31 drives auger shaft 16 by means of V-belt 33 running over pulley 34 carried on the outer end of shaft 16. Pulley 32 drives belt shaft 35 by means of V-belt 36 running over pulley 37 carried on the outer end of shaft 35.

Figs. 2 and 4 illustrate the manner of driving the picker rolls 25, 26, and 27 in the same rotational direction. A pulley 38, carried on the opposite end of belt pulley shaft 35, is drivingly connected to pulleys 39, 40, and 41 carried on the respective adjacent outer ends of picker roll shafts 42, 43, and 44, by means of a single V-belt 45. Idler rollers 46, 47, and 48 contact the V-belt 45 between respectively adjacent pulleys 38—39, 39—40, and 40—41, forcing the belt into firm contact with an ample peripheral portion of each pulley to effect a non-slip drive.

Operation

With the fan, the auger, the picker rolls, and the belt 19 all in operation, as described, material to be cleaned or separated is introduced into hopper 13. By means of a vertically adjustable combination gate and spreader 49 mounted inside the hopper, as shown in Fig. 1, the volume flow of material from the hopper through housing inlet 12 may be controlled.

Material entering the housing through inlet 12 is immediately subjected to the effect of the air blast from fan 17. A major portion of the lighter weight particles, such as cheat, grass grain, chaff, etc. is either carried upward through the upright leg of the housing and dumped through outlet 24, or is forced against the upwardly traveling run of belt 19 by the blast and is carried upward by the belt toward outlet 24.

Additional light weight material, mixed with other heavier material, passes into contact with the picker rolls and is thrown upward and toward belt 19, and by the combination action of the air blast and the upwardly moving belt 19, is discharged through outlet 24. The heavier weight material, such as wheat grains, falls downward through the air blast, through the picker rolls, and through the space between picker roll 27 and belt 19, and enters settling chamber 14. Such settled material is continuously discharged from the settling chamber by the auger, through an outlet in the side of the housing, not visible in the drawing.

It will thus be seen that when a mixture of wheat grain, cheat grain grass, chaff, etc., is fed into the cleaner, the relatively lighter weight particles, such as the cheat grain and chaff are separated from the heavier wheat grains. The wheat grains gravitate to the bottom of the settling chamber and the unwanted lighter weight particles are moved upward through the upright leg of the housing by the combination action of the upwardly traveling air blast and the upwardly traveling run of the belt. It will be understood by those familiar with this art that the invention is capable of gravity-air separation of mixtures other than wheat and cheat grass grains, which mixture was used simply as an example.

It should also be understood that the cleaner described may not only be used as a stationary cleaner at any desired location but may also be built into a wheat harvesting combine, or may be mounted on the combine as an attachment.

Having described the invention with sufficient clarity to enable those familiar with this art to construct and use it, I claim:

1. A cleaner for comminuted material comprising: an elongated upright housing of substanitally rectangular cross section having a front wall, a rear wall and two side walls; a discharge opening at the upper end of said housing defined by the upper end of the rear wall and an arcuate overlying hood-like extension of the front wall; a driven endless belt mounted upright within the housing with its upwardly traveling run well spaced from the front wall and adjacent the rear wall, the width of the belt being substantially the same as the width of the housing, and the upper end of the belt being at a level above the upper end of said rear wall and spaced from the hood to provide free rearward air passage across the upper end of said rear wall without obstruction therefrom; a blower communicating with the lower end of said housing and having its discharge directed rearwardly and at a slight upward angle toward the lower end of the upwardly traveling run of the belt; and a material inlet in the front wall of said housing at a level above and adjacent the path of air discharge from the blower, whereby lighter particles of the material are forced against said belt and are carried upward both by the belt and by the upwardly traveling airblast, and discharged from the upper end of the housing, while the heavier particles gravitate downward through the air blast and accumulate in the lower end of the housing, said belt providing a firm surface for the collection of the lighter particles thereon and the impingement of air thereagainst.

2. The cleaner described in claim 1, and a material collecting trough communicating with the lower end of the housing.

3. The cleaner described in claim 2, and a conveyor in said collecting trough for moving cleaned material out of the housing.

4. The cleaner described in claim 1, and a driven material agitator within the housing for urging incoming material toward the upwardly traveling run of said belt.

5. The cleaner described in claim 4 in which said material agitator comprises a plurality of closely spaced star wheels fixed on a plurality of spaced parallel shafts, the star wheels on one shaft extending between the star wheels of an adjacent shaft, and all of said shafts rotating in the same direction.

6. The cleaner described in claim 1, and a transverse material guard carried by the housing near the upper end of said belt and immediately adjacent the downwardly traveling run thereof, to prevent material moved upward in the housing, by the belt and by the air blast, from gravitating to the lower end of the housing aft of said belt.

7. A grain cleaner comprising: a housing having an elongated upright leg which is generally rectangular in cross section, the upper end of the rear wall of said leg terminating at a level below the other three walls, the upper end of the front wall being concave and extending across the upper end of the leg to form an air discharge guide and hood for directing air rearwardly across and beyond the upper end of said rear wall; spaced belt pulleys journaled on transverse axes within the upright housing leg, one adjacent the lower end of said rear wall, and one adjacent and at a higher level than the upper end of said rear wall yet spaced below the arcuate hood, both pulleys lying in a common plane substantially parallel to said rear wall; a driven endless belt mounted on said pulleys with that belt run nearest the said rear wall traveling downward, the upwardly traveling belt run and the two side walls and front wall of the housing leg together defining a free air passage, said belt extending from side wall to side wall of the housing; a driven blower communicating with the lower end of said housing and having its discharge directed rearwardly and at a slight upward angle toward the lower end of said belt; means in the said front wall for introducing grain into said housing at a level above and adjacent the path of air discharge from said blower, whereby grain introduced into the housing is urged by airblast toward the upwardly traveling run of said belt, and light weight foreign matter travels upward through and out the upper end of the housing, while the heavier grain particles gravitate through the blower air stream and accumulate in the lower end of the housing, said belt providing a firm surface for the collection of the light weight matter thereon and the impingement of air thereagainst.

8. The cleaner described in claim 7, and a material collecting trough communicating with the lower end of the housing.

9. The cleaner described in claim 8, and a conveyor in said collecting trough for moving cleaned material out of the housing.

10. The cleaner described in claim 7, and a driven material agitator within the housing for urging incoming material toward the upwardly traveling run of said belt.

11. The cleaner described in claim 7, and a transverse material guard carried by the housing near the upper end of said belt and immediately adjacent the downwardly traveling run thereof, to prevent material moved upward in the housing, by the belt and by the air blast, from gravitating to the lower end of the housing aft of said belt.

12. A grain cleaner comprising: an elongated upright housing having front, rear, and side walls, and having a discharge opening near its upper end aft of its rear wall: an internally concave wall extending upward and rearward from the upper end of the front wall for directing air transversely across the upper end of the rear wall and through said opening; a driven endless belt in said housing mounted upright and closely adjacent the rear wall and spaced from the front wall to define therewith and with the side walls an open air passage, the upper end of the belt being located above the upper end of the rear wall and spaced downward from said concave wall; a blower communicating with the lower end of said housing and having its discharge directed rearwardly and at an upward angle toward the lower end of the upwardly traveling run of said belt; a grain inlet in the front wall of said housing adjacent the path of air discharge from the blower; and means adjacent the grain introducing inlet and extending into said path of air discharge for physically contacting incoming grain for agitating and moving it toward the upwardly traveling run of said belt and generally in the direction of travel of the air blast from the blower.

References Cited in the file of this patent

UNITED STATES PATENTS

| | | |
|---|---|---|
| 555,533 | Randolph | Mar. 3, 1896 |
| 661,166 | Boyd | Nov. 6, 1900 |
| 771,273 | Rowland | Oct. 4, 1904 |
| 1,487,303 | Wollmann | Mar. 18, 1924 |
| 2,226,009 | Miller | Dec. 24, 1940 |